March 26, 1940.                R. R. ROBERTSON                2,195,286
                        CONTRACTION AND CENTER JOINT
                           Filed March 3, 1939
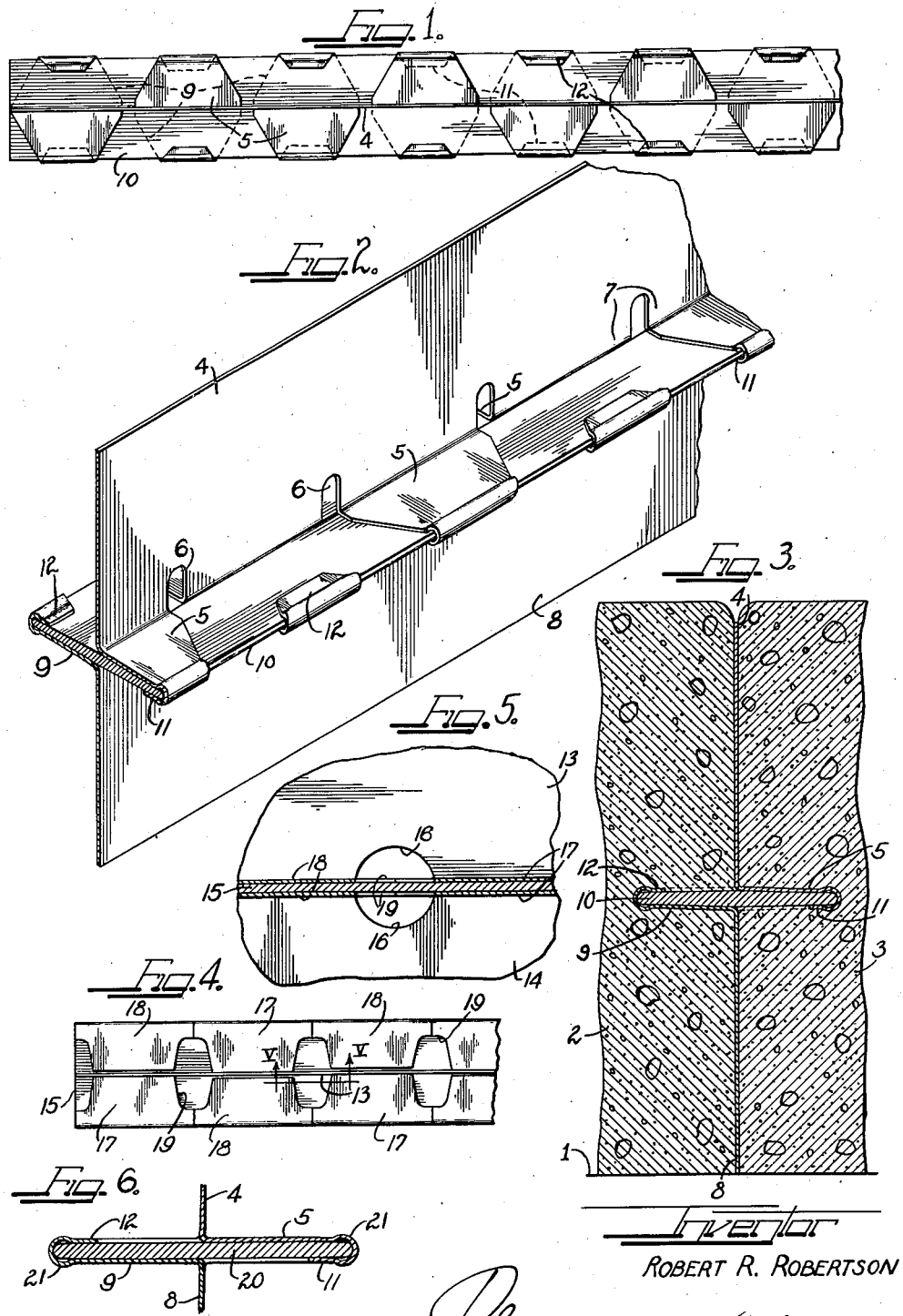
Inventor
ROBERT R. ROBERTSON Patented Mar. 26, 1940

2,195,286

UNITED STATES PATENT OFFICE 2,195,286

CONTRACTION AND CENTER JOINT

Robert R. Robertson, Chicago, Ill.

Application March 3, 1939, Serial No. 259,582

11 Claims. (Cl. 94—17)

This invention relates to road joints and more particularly to contraction and center joints including a transverse seal plate which separates upper and lower joint plates, each having spaced openings therein adjacent the seal plate, with said openings separating staggered or alternately arranged flanges which seat upon the upper and lower surfaces of the seal plate with the ends of the flanges engaged around and gripping against the upper and lower surfaces of the margins of the seal plate to tightly hold the seal plate gripped between the upper and lower joint plates to complete the assembly of the joint unit. The improved joint is so constructed that the packing of concrete forming the road slabs on opposite sides of the joint is made more complete or perfect by providing the upper and lower joint plates with the spaced openings and thereby tending to obviate air pockets in the corners of the joint unit, both below and above the seal plate. The openings in the upper and lower joint plates also provide an arrangement whereby the concrete is permitted to pass through the openings and said openings divide the margins of the joint plates on opposite sides of the seal plate into sections which may respond to a hingelike action when the road slabs on opposite sides of the joint contract to cause the staggered or diagonally opposite gripping flanges of the joint plates to move in opposite directions due to the gripping action of the slabs on said flanges.

It is an object of this invention to provide an improved type of contraction or center joint wherein the upper and lower joint plates positioned on opposite sides of a transverse or intermediate plate are provided with oppositely projecting or staggered anchoring flanges which grip and hold the intermediate or seal plate in position.

It is also an object of this invention to provide an improved contraction or center joint wherein upper and lower joint plates are formed to grip opposite longitudinal margins of an intermediate seal plate to hold same clamped in position.

A further object of the invention is the provision of an improved type of contraction or center joint wherein an intermediate seal plate is gripped between upper and lower joint plates having gripping flanges projecting from opposite sides thereof and contacting opposite surfaces of the intermediate seal plate but leaving portions of the upper and bottom surfaces of the seal plate exposed to permit the concrete of the road slabs to bond with the gripping flanges of the joint plates to permit movement of portions of the joint plates in opposite directions with respect to the seal plate with the contraction of the road slabs on opposite sides of the joint unit.

It is furthermore an object of this invention to provide an improved and simplified form of contraction or center joint wherein an intermediate seal plate is clamped in position by upper and lower joint plates, and wherein the clamping portions of the joint plates are adapted to have sliding movement with respect to the seal plate with the movement of the road slabs due to temperature changes, load impacts or other causes.

It is an important object of this invention to provide an improved and simplified form of contraction and center joint, adapted to be constructed of comparatively thin metal and adapted to be embedded in concrete to separate road slabs by means of vertical plates or members which are so formed that they grip and hold a transverse or horizontal plate or member in position to tie the slabs together, said joint being formed by plate members which are adapted to be assembled either in the factory or on location without requiring brazing, riveting or other permanent securing means to be used since the fastening means for the joint unit form part of vertical members of the joint and engage opposite margins of an intermediate horizontal seal member of the joint in a manner permitting the gripping action of the concrete slabs to slide the gripping members with respect to the intermediate seal member and hinge portions of the vertical members of the joint in opposite directions with the contraction of the road slabs.

Another important object of the invention is the construction of a simplified and inexpensive type of contraction or center joint wherein upper and lower joint plates have staggered and oppositely projecting gripping members formed thereon for engaging opposite margins of an intermediate seal plate, and wherein the upper and lower joint plates are provided with spaced apertures or notches which serve a triple purpose, that is, to permit proper packing of the concrete on opposite sides of the joint without forming air pockets, secondly to provide an arrangement whereby portions of the upper and lower joint plates between the spaced openings or notches are adapted to be deflected in opposite directions with the contraction of the road slabs, and thirdly, affording an arrangement permitting the arching or crowning of the edges of the joint without crumpling or distorting the joint plates.

Other and further important objects of this invention will be apparent from the disclosures in the specification and the accompanying drawing.

The invention (in a preferred form) is illustrated in the drawing and hereinafter more fully described.

On the drawing:

Figure 1 is a fragmentary top plan view of an improved contraction and center joint embodying the principles of this invention.

Figure 2 is an enlarged fragmentary isometric view of the joint shown in Figure 1.

Figure 3 is a fragmentary vertical detail section taken through the joint when embedded between concrete road slabs.

Figure 4 is a fragmentary top plan view of a modified form of contraction and center joint wherein the free ends of the gripping flanges of the joint plates extend substantially up to the joint plates.

Figure 5 is an enlarged fragmentary detail section taken on line V—V of Figure 4.

Figure 6 is a fragmentary transverse section of another form of joint including a modified form of transverse seal plate.

As shown on the drawings:

As illustrated in Figure 3, the contraction or center joint of this invention covers a joint forming mechanism which is adapted to be supported on a road subgrade 1 and is then embedded in concrete which forms road slabs 2 and 3 on opposite sides of the joint forming mechanism.

The improved joint unit is preferably of the contraction joint type but may be used as a center joint if desired. The improved joint is of simplified and of substantially light weight construction and embodies sufficient strength without the use of heavy and expensive material. The improved joint is of novel construction designed to eliminate the use of brazing, riveting or other permanent securing means for securing the various members of the joint together.

The improved joint is constructed of sheet metal and comprises a main body portion consisting of an upper plate 4, the lower portion of which is stamped out or cut to provide a plurality of tapered flanges or gripping members 5 which are alternately deflected outwardly in opposite directions at substantially right-angles to the upper plate 4 to provide a staggered flange arrangement leaving spaces between the flanges 5 on each side of the upper plate 4. In the formation of the tapered flanges 5 out of one of the longitudinal marginal portions of the upper plate 4, spaced openings or notches 6 are provided which extend from the line of deflection of the flanges 5 upwardly toward the upper edge of the upper plate 4 to form separated sections or panels 7. Also forming part of the main body portion of the joint is a bottom plate 8, the upper longitudinal marginal portion of which is cut out or stamped to provide a plurality of tapered extensions 9 which are bent outwardly at substantially right-angles to the plate 8 with alternate extensions projecting in opposite directions to provide a staggered arrangement of the flanges or gripping members 9. As clearly illustrated in Figures 1 and 2, the flanges or gripping members 9 of the lower joint plate 8 are arranged to be positioned beneath the spaces between the upper flanges 5.

Separating the flanges 5 of the upper plate 4 and the flanges 9 of the lower plate 8 of the joint is a double tapered transverse seal plate 10 which forms the middle portion of the joint. The staggered flanges 5 of the top plate 4 of the joint seat against the top surface of the seal plate 10 while the staggered flanges 9 of the lower joint plate 8 seat against the bottom surface of the seal plate 10 beneath the spaces between the flanges 5. This arrangement positions the flanges 5 and 9 diagonally with respect to one another on opposite sides of the seal plate 10.

For the purpose of securing the joint plates 4 and 8 to the transverse seal plate 10, portions of the flanges 5 of the upper plate 4 are formed with bight sleeves or beads which engage around the longitudinal edges of the seal plate 10 and have the ends of the flanges projecting inwardly to seat against the bottom surface of said seal plate 10 to form gripping tips or clamps 11. The tapered ends of the lower flanges 9 are also formed with bight sleeves or beads which engage upwardly around the longitudinal edges of the seal plate 10 and have the ends of the flanges projecting inwardly to grip against the top surface of the seal plate 10 to form gripping tips or clamps 12. As clearly illustrated in Figures 1 and 2, it will be noted that the clamping members of the upper and lower joint plates grip against opposite surfaces of the longitudinal portions of the seal plate 10 to securely hold the plate members of the joint in assembled relation ready for use.

The improved joint unit provides an improved arrangement whereby the three joint plates are connected together in assembled relation by means of the staggered oppositely projecting flanges or gripping members which are so formed that they contact both the upper and lower surfaces of the double tapered seal plate 10 in such a manner that when the joint units are embedded in concrete as illustrated in Figure 3, the gripping flanges are so embedded in the concrete slabs on opposite sides of the joint that when the concrete slabs contract due to temperature changes or other causes the looped or hook shaped beaded flanges or gripping members 5 and 9 are adapted to be moved transversely with respect to the seal plate 10 with the opposite flanges moving in opposite direction thereby causing the panel sections 7 between the openings or notches 6 to hingedly swing outwardly in the direction of movement of the gripping flanges forming a part thereof. The panel sections 7 of each of the upper and lower joint plates 4 and 8 are arranged so that the adjacent panel sections of each joint plate deflect or swing in opposite directions with the movement of the road slabs, and the hinge movement of said panel sections 7 is permitted by the provision of the notches 6.

Attention is also called to the fact that the notches 6 in the joint plates also permit the joint unit when used as a contraction joint to be curved or crowned to conform to the crowning requirements of the road. With the provision of the notches 6, the top and bottom edges of the joint plates 4 may be crowned or curved the required amount without causing crumpling or distortion of the plates since the open ends of the notches 6 may be closed or opened an amount sufficient to compensate for the crowning of the joint unit.

Figures 5 and 6 illustrate a modified form of contraction or center joint including a top joint plate 13, a bottom joint plate 14 and a transverse seal plate 15. Each of the joint plates 13 and 14 is provided with a plurality of spaced openings or notches 16 leaving a plurality of extensions. The extensions of the top joint plate 13 are bent outwardly in opposite directions to provide staggered flanges or gripping members 17 of channel or U-shaped formation which extend outwardly over the top surface of the seal plate 15 around the longitudinal edges thereof and then inwardly against the bottom surface of the seal plate 15 back to approximately the side of the lower joint plate 14. In a similar manner, the lower joint plate 14 has extensions thereof bent outwardly to contact the under surface of the seal plate 15 and said extensions are then bent upwardly over the top surface of the seal plate and extend to the sides of the top joint plate 15 forming the channel or U-shaped flanges or gripping members 18 which are disposed between the members 17 of the top plate. As clearly illustrated in Figure 4, the gripping flanges or members 17 of the top joint plate 13 are arranged in staggered relation as are also the flanges or gripping members 18 of the lower joint plate 14. In order to provide suitable bonding engagement of the concrete with the flanges or gripping members 17 and 18, said flanges or members are slotted or recessed to provide the openings 19 above and below the seal plate 15.

When the modified form of contraction or center joint, such as illustrated in Figures 4 and 5, is embedded between the concrete slabs, the flanges or gripping members 17 and 18 are embedded in the concrete and are caused to slide transversely on the seal plate 15 when the concrete slabs contract due to temperature changes or other causes. With the movement of the gripping members of flanges 17 and 18 with respect to the seal plate 15, the portions of the upper and lower plates 13 and 14 between the notches 16 are also permitted to deflect or have a hinge action caused by the movement of the flanges or gripping members 17 and 18 with which they are integrally connected. As clearly illustrated in Figure 4, the gripping flanges 17 and 18 cover the major portion of the seal plate 15 and alternate with respect to one another on each side of the joint unit.

The second modification of the transverse or longitudinal contraction joint illustrated in Figure 6 of the drawings is similar to that illustrated in Figure 2 with the exception that the intermediate or transverse member of the joint instead of being thicker in the middle portion and tapering toward both sides as shown in Figure 3 is replaced by a modified load transfer cross plate or seal plate 20 which is flat on both the top and bottom and of even thickness with rounded longitudinal edges around which the enlarged bight or bead portions 21 of the gripping flanges of the upper and lower joint plates engage.

In the two forms of the joint illustrated in Figures 1, 2, 3, and 6, it will be noted that the bight portions of the gripping members or flanges 5 and 9 are slightly enlarged to form spring-like beads or sleeves to eliminate possible pinching or bonding and permit the load transfer or seal plates 10 and 20 to be more easily engaged in place in the U-shaped portions of the gripping members of the upper and lower joint plates. Attention is also called to the fact that the seal plates 10, 15 and 20 have the longitudinal edges thereof rounded and if desired slightly undersize so that the plates can more easily move in the concrete when the bond is broken. In order to increase the efficiency of the joints, the load transfer or seal plates 10, 15 and 20 may be coated or greased to prevent a strong bond with the concrete.

It will of course be understood, that various details of construction may be varied through a wide range without departing from the principles of this invention, and it is, therefore, not the purpose to limit the patent granted hereon otherwise than necessitated by the scope of the appended claims.

I claim as my invention:

1. A road joint for embedding between adjacent concrete road slabs, said joint comprising a transverse seal plate, upper and lower joint plates disposed in substantially the same plane and on opposite sides of the seal plate, and gripping members integrally formed on the joint plates and engaging around both longitudinal margins of the seal plate.

2. A road joint for embedding between adjacent concrete road slabs, said joint comprising a transverse seal plate, upper and lower joint plates disposed in substantially the same plane above and below the seal plate, said upper and lower joint plates having openings therein adjacent the seal plate, and gripping members projecting in opposite directions from the upper and lower joint plates and contacting the upper and lower surfaces of the seal plate to hold the seal plate and the joint plates in assembled relation.

3. A road joint for embedding between concrete road slabs, said joint comprising upper and lower joint plates, a seal plate disposed therebetween, and gripping members formed on the joint plates and engaging around the seal plate from opposite sides thereof to hold the joint plates and the seal plate in assembled relation and allowing a transverse movement of the gripping members with respect to the seal plate with a contraction movement of the road slabs.

4. A road contraction or center joint for embedding between adjacent concrete road slabs, said joint comprising a seal plate embedded in the concrete to project from one road slab into an adjacent slab, joint plates disposed on opposite sides of the seal plate and having notches therein adjacent the seal plate, and staggered flanges integrally formed on each of the joint plates contacting opposite surfaces of the seal plate and bent around the longitudinal margins of said seal plate.

5. A road contraction and center joint comprising a double tapered seal plate, joint plates disposed on opposite sides of the seal plate at substantially right-angles thereto, staggered gripping members integrally formed on the margins of the joint plates adjacent the seal plate, said flanges of one of the joint plates being arranged to be disposed opposite the spaces between the flanges of the joint plate on the opposite side of the seal plate, said flanges having extensions engaged downwardly and upwardly around the longitudinal margins of the seal plate to hold the same in position between the joint plates.

6. A road contraction and center joint for embedding between adjacent concrete road slabs, said joint comprising an intermediate plate embedded in the concrete on opposite sides of the joint, an upper plate and a lower plate disposed on opposite sides of the intermediate plate and at substantially right-angles thereto, said upper and lower plates having a series of spaced openings provided therein adjacent the intermediate plate, and U-shaped gripping flanges integrally formed on the upper and lower joint plates in contact with both the upper and lower surfaces of the intermediate plate and movable with respect thereto with the movement of the concrete road slabs.

7. A road contraction or center joint for embedding between concrete road slabs, said joint comprising an intermediate plate embedded in the concrete on opposite sides of the joint, an upper joint plate and a lower joint plate disposed on opposite sides of the intermediate plate and of substantially right-angles thereto, said upper and lower joint plates having a series of spaced openings therein adjacent the intermediate plate, and gripping members integrally formed on the upper and lower joint plates and alternately projecting in opposite directions from said joint plates, said gripping members formed with bead bight portions engaged around the longitudinal margins of the intermediate plate to hold the same in position.

8. A road contraction type joint for embedding between concrete road slabs, said joint comprising an intermediate plate embedded in the concrete on opposite sides of the joints, an upper joint plate and a lower joint plate disposed on opposite sides of the intermediate plate, and U-shaped members projecting from opposite sides of each of the upper and lower joint plates and contacting opposite sides of the intermediate plate, said gripping members having enlarged beads forming the bight portions thereof and engaging around the longitudinal edges of the intermediate plate.

9. A contraction type joint for embedding between concrete road slabs, said joint comprising an intermediate plate which is of greater thickness along the longitudinal middle and tapers outwardly in opposite directions to the longitudinal edges, main joint plates disposed on opposite sides of the intermediate plate, and beaded U-shaped gripping members integrally formed on the main joint plates and projecting from opposite sides thereof to engage around the longitudinal portions of the intermediate plate and in contact with both the upper and lower surfaces of said intermediate plate to hold the same in position.

10. A contraction type of road joint for embedding between concrete road slabs, said joint comprising a painted intermediate plate increasing in thickness from the sides thereof to the middle, main joint plates disposed on opposite sides of the intermediate plate and having spaced openings therein, and hook shaped gripping members integrally formed on the main joint plates and engaged downwardly and upwardly around the longitudinal margins of the painted intermediate plate and movable with respect thereto with the movement of the road slabs due to temperature changes and other causes.

11. A road joint for embedding between adjacent concrete road slabs, said joint comprising a greased intermediate plate, notched upper and lower joint plates disposed on opposite sides of the intermediate plate, and U-shaped members connected with the main joint plates and staggered with respect to one another to alternately engage around opposite longitudinal margins of the intermediate plate, said gripping members of each said main joint plates disposed between the gripping members of the opposite main joint plate.

ROBERT R. ROBERTSON.